(12) United States Patent
Flora et al.

(10) Patent No.: US 9,072,224 B1
(45) Date of Patent: Jul. 7, 2015

(54) DEVICE AND METHOD FOR HARVESTING FRUIT FROM A TREE BY SHAKING

(71) Applicants: Jonathan J Flora, Modesto, CA (US); Douglas W Flora, Modesto, CA (US); Adam Benedict, Modesto, CA (US); Rodney Westergaard, Winton, CA (US)

(72) Inventors: Jonathan J Flora, Modesto, CA (US); Douglas W Flora, Modesto, CA (US); Adam Benedict, Modesto, CA (US); Rodney Westergaard, Winton, CA (US)

(73) Assignee: Exact Corporation, Modesto, CA (US)

( * ) Notice: Subject to any disclaimer, the term of this patent is extended or adjusted under 35 U.S.C. 154(b) by 0 days.

(21) Appl. No.: 13/689,602

(22) Filed: Nov. 29, 2012

Related U.S. Application Data

(60) Provisional application No. 61/564,698, filed on Nov. 29, 2011.

(51) Int. Cl.
*A01D 46/00* (2006.01)
*A01D 46/26* (2006.01)

(52) U.S. Cl.
CPC ........................................ *A01D 46/26* (2013.01)

(58) Field of Classification Search
USPC ......... 56/340.1, 328.1, 333; 414/23; 172/311, 172/316
See application file for complete search history.

(56) References Cited

U.S. PATENT DOCUMENTS

| | | | | |
|---|---|---|---|---|
| 2,753,638 A * | 7/1956 | Mork | ............................ | 172/812 |
| 2,815,250 A * | 12/1957 | Thornton-Trump | ............. | 182/2.8 |
| 3,183,656 A * | 5/1965 | Shipley, Jr. | .................. | 56/340.1 |
| 3,656,283 A * | 4/1972 | Shipley | ............................. | 56/1 |
| 3,656,287 A * | 4/1972 | Morrison et al. | ............ | 56/340.1 |
| 3,785,131 A * | 1/1974 | Friday et al. | .................. | 56/340.1 |
| 4,151,886 A * | 5/1979 | Boetto et al. | .................. | 172/311 |
| 4,194,347 A * | 3/1980 | Peters | .......................... | 56/340.1 |
| 4,308,919 A * | 1/1982 | Coughran, Jr. | ................ | 172/240 |
| 4,561,505 A * | 12/1985 | Williamson | .................. | 172/776 |
| 4,609,203 A * | 9/1986 | Steilen et al. | ................. | 172/439 |
| 4,727,665 A * | 3/1988 | Verseef | ........................... | 37/236 |
| 4,768,332 A * | 9/1988 | Bizzini | ......................... | 56/340.1 |
| 5,413,453 A * | 5/1995 | Hill | ............................... | 414/729 |
| 5,501,257 A * | 3/1996 | Hickman | .................... | 144/34.1 |
| 5,653,097 A * | 8/1997 | Hill | ............................... | 56/340.1 |
| 5,775,075 A * | 7/1998 | Dannar | ......................... | 56/15.2 |
| 5,927,056 A * | 7/1999 | Renehan | ...................... | 56/340.1 |
| 6,658,834 B1 * | 12/2003 | Mayo | ............................. | 56/340.1 |
| 6,684,614 B2 * | 2/2004 | Greenwell | ..................... | 56/11.7 |
| 6,925,792 B2 * | 8/2005 | Suter et al. | .................... | 56/340.1 |
| 6,945,022 B2 * | 9/2005 | Suter et al. | .................... | 56/328.1 |
| 7,073,604 B1 * | 7/2006 | Dobson et al. | ................ | 172/311 |
| 7,350,346 B2 * | 4/2008 | Russell et al. | ................ | 56/340.1 |
| 7,543,436 B2 * | 6/2009 | Scott et al. | .................... | 56/328.1 |
| 2008/0016838 A1 * | 1/2008 | Pellenc et al. | ................ | 56/340.1 |

* cited by examiner

*Primary Examiner* — Árpád Fábián-Kovács
(74) *Attorney, Agent, or Firm* — R. Scott Kimsey, Esq.; Klein DeNatale Goldner

(57) ABSTRACT

A tree shaker for harvesting fruits, nuts, and other tree-borne products includes a mobile vehicle and a boom attached to the vehicle and offset at an angle with respect to a longitudinal axis of the vehicle. A boom pivot is provided along the length of the boom. The boom pivot is lockable such that when the boom pivot is unlocked the boom is free to pivot around the boom pivot, and when the boom pivot is locked the boom is fixed around the boom pivot.

17 Claims, 5 Drawing Sheets

DEVICE AND METHOD FOR HARVESTING FRUIT FROM A TREE BY SHAKING

RELATED APPLICATIONS

The present Application claims priority of U.S. Provisional Patent Application No. 61/564,698, filed on Nov. 29, 2011 and entitled "Improved Tree Shaker and Method of Use." The above-reference Provisional Patent Application is incorporated herein by reference in its entirety.

BACKGROUND OF THE INVENTION

1. Field of the Invention

The present invention relates generally to a tree shaker, and more specifically to an improved tree shaker for harvesting nuts, fruits, and other tree-borne crops.

2. Background

Tree shakers are known in the art for harvesting nuts, fruits, and other tree-borne products. Many shakers currently used in the industry are of the "monoboom" variety, employing a boom extending forwardly from a tractor or other device, with a shaker head present at the end of the boom for grasping a tree and imparting a shaking force to the tree. Shaker pads may be present on the shaker head to allow the device to more effectively grip and shake the tree. The shaking action of the device dislodges fruits, nuts, and other products, which then fall from the branches of the tree to be harvested.

Existing tree shakers have a number of disadvantages. The tree shakers often damage the bark of the tree when grasping or shaking the tree. Such damage can be permanent and can affect future crop yield. Further, tree bark damage can render the tree susceptible to disease. In addition, the shaking action can cause damage to the tree shaker itself, leading to costly repairs or even replacement of the expensive devices. Further, the rigidity of the boom leads to less than optimal conformation of the shaker to the tree itself, again increasing damage to both the tree and the shaker.

As noted above, existing tree shakers tend to provide a boom that extends forwardly, in the direction of travel of the tree shaker. This placement of the boom can obstruct the vision of the operator of the shaker when approaching a tree. This again leads to an increased risk of damage to the tree because the operator cannot see properly when engaging with the tree to be shaken. Some tree shaking devices include a boom oriented such that it extends perpendicular to the direction of travel of the device. Such an arrangement is inefficient, however, as the process of engaging a tree perpendicular to the direction of travel of the shaker is slow.

What is needed, then, is an improved tree shaker that provides for greater visibility, reduced tree damage, and reduced damage to the shaker itself.

SUMMARY OF THE INVENTION

The present invention provides a tree shaker including a mobile vehicle and a boom attached to the vehicle and offset at an angle with respect to a longitudinal axis of the vehicle. A boom pivot is provided along the length of the boom. The boom pivot is lockable such that when the boom pivot is unlocked the boom is free to pivot around the boom pivot, and when the boom pivot is locked the boom is fixed around the boom pivot.

In another aspect of the invention, the angle of the boom with respect to the longitudinal axis of the vehicle is greater than about ten degrees.

In another aspect of the invention, the angle of the boom with respect to the longitudinal axis of the vehicle is less than about forty-five degrees.

In another aspect of the invention, the tree shaker includes a shaker head. The shaker head includes at least one engageable and disengageable clamping arm. The shaker head is attached to the boom at an opposite end of the boom from the end of the boom attached to the vehicle.

In another aspect of the invention, the at least one clamping arm includes a shaker pad attached to an inward-facing surface of the clamping arm. When the clamping arm engages a tree, the shaker pad is positioned between the tree and the clamping arm.

In another aspect of the invention, the shaker head includes a first clamping arm fixedly attached to the boom and a second clamping arm pivotably attached to the first clamping arm at a clamping arm pivot. The second clamping arm is engageable and disengageable by pivoting around the clamping arm pivot.

Another aspect of the invention provides a method for harvesting fruit, nuts, and other tree-borne products. The method comprises the steps of approaching a tree with a vehicle including a boom offset at an angle to a longitudinal axis of the vehicle, the boom having a lockable and unlockable boom pivot; in some embodiments, unlocking the boom pivot when the shaker head is in position for the clamping arms to engage the tree; engaging the tree by a closing motion of at least one of the clamping arms; in some embodiments, locking the boom pivot; applying a shaking force to the tree; unlocking the boom pivot; and disengaging the clamping arms from the tree.

In another aspect of the invention, the method also includes the step of returning the boom to its original position after disengaging from the tree.

In another aspect of the invention, the step of unlocking the boom pivot is performed prior to the step of approaching the tree.

In another aspect of the invention, the vehicle includes a vehicle body, first and second wheels rotatably attached to the vehicle body at a front end, and at least one wheel rotatably attached to the vehicle body at a rear end.

In another aspect of the invention, the vehicle body defines an interior operator cab.

DETAILED DESCRIPTION OF THE INVENTION

Figure 1:
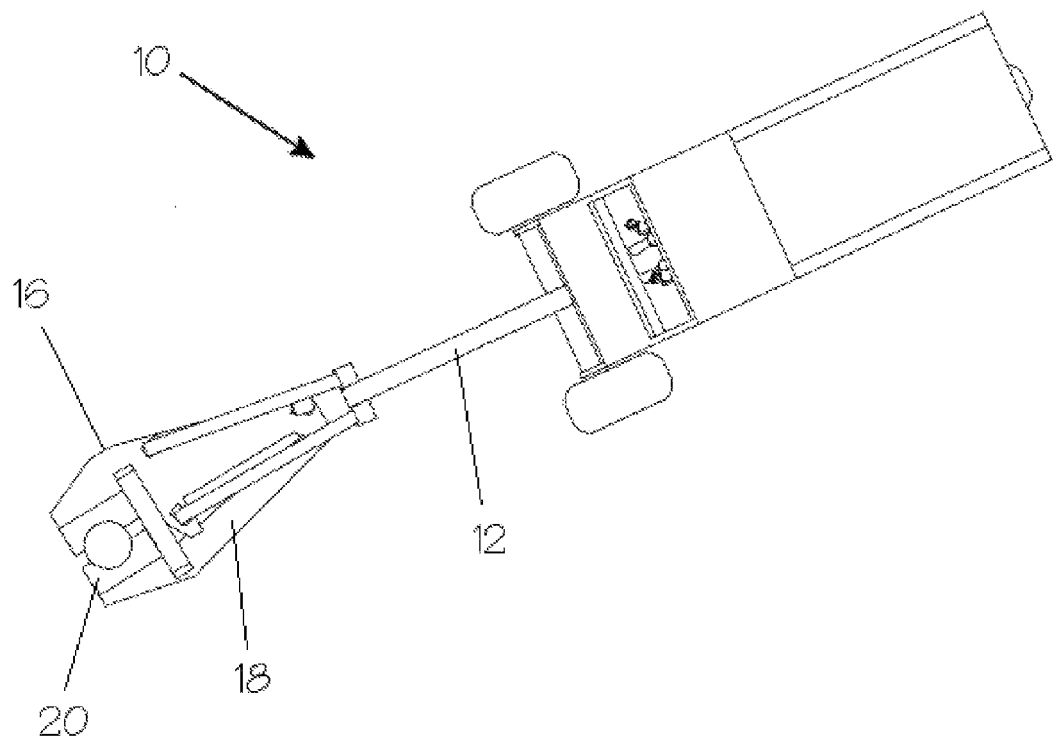
FIG. 1 is a top plan view of a prior art tree shaking device.

Turning now to the drawings, wherein like numerals indicated like parts, FIG. 1 depicts a prior art tree shaking device 10 having a boom 12, a shaker head 16, clamping arms 18, and conforming shaker pads 20. An operator of the device approaches a tree, engages the tree with shaker head 16, and then imparts a shaking motion to the tree. After the fruit, nuts, or other products have been dislodged from the tree, the operator opens clamps arms 18 and disengages from the tree. Boom 12 of device 10 is in line with the longitudinal axis of device 10, that axis being the one that extends from the rear of device 10 to the front of device 10.

Figure 2:
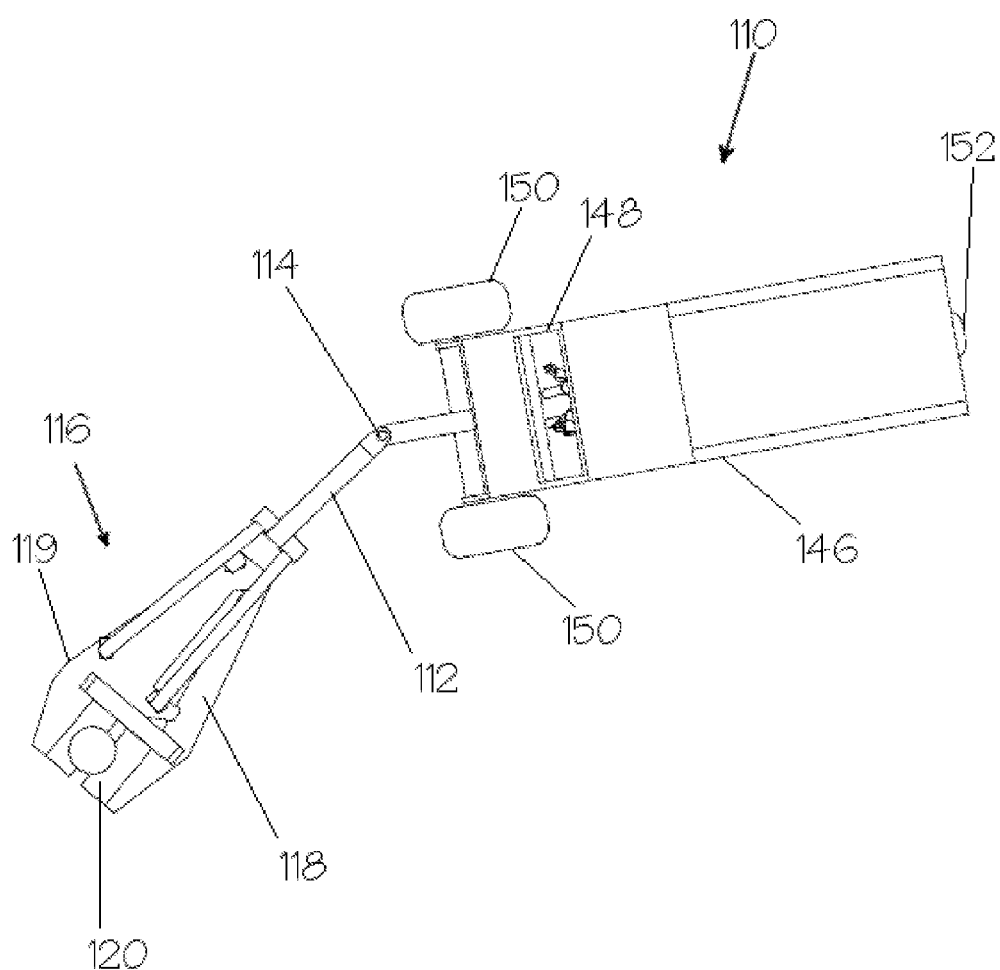
FIG. 2 is a top plan view of one embodiment of a tree shaking device of the present invention.

FIG. 2 depicts one embodiment of an improved tree shaker 110 of the present invention. As can be seen in the Figure, improved tree shaker 110 has an angled boom 112 that pivots around boom pivot 114 and is at an angle with respect to the longitudinal axis of shaker 110. For purposes of this document, the "longitudinal axis" of the shaker or of the vehicle body described below is the axis extending between the front and rear of the shaker or vehicle and parallel to the sides of the shaker or vehicle as those aspects of the invention are shown in the drawings. This angled arrangement of boom 112 provides the operator of device 110 with greater visibility when approaching a tree, thereby allowing the operator to more accurately position device 110 with respect to any given tree.

The mobile tree shaker 110 shown in FIG. 2 is exemplary of the present invention. In the embodiment shown, tree shaker 100 includes a vehicle body 146 having an operator cab 148 included therein. The vehicle body 146 has two wheels 150 located at a forward end thereof and one wheel 152 located at the rear of vehicle body 146. Operator cab 148 preferably includes a seat for an operator of the present device, as well as controls for steering the device, adjusting the speed and direction of the device, and manipulating boom 112, described above, as well as manipulation of the shaker head and clamp arms described below. Any suitable controls may be used for these various functions of the device, and it is contemplated that a variety of possible control mechanisms for use with the present invention will be readily apparent to those of skill in the art upon reading this disclosure. It is also contemplated that the present tree shaker and the principles associated therewith may be adapted for use with a variety of vehicles. Such vehicles may have a variety of shapes, sizes, numbers of wheels, and so forth. The operator cab may also be provided in a variety of sizes and configurations, and may be suitable for a single operator or for multiple operators. In some embodiments, the operation may be located on an open seat atop the vehicle rather than within an operator cab or other enclosed area. The type of vehicle used with the present invention is not limiting, and it is contemplated that the present invention may be adapted for retrofit onto a variety of pre-existing vehicles.

Figure 3:
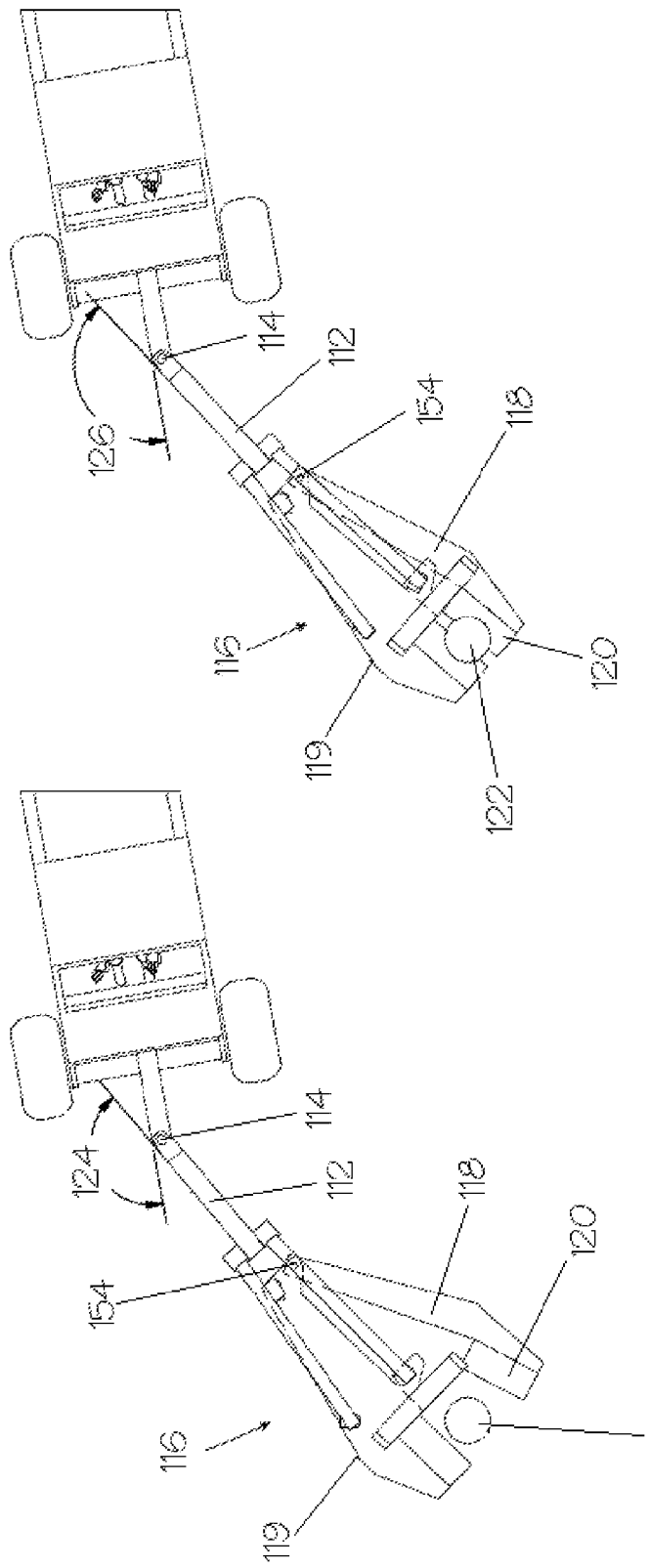
FIG. 3a is a top plan view of one exemplary embodiment of a tree shaking device of the present invention, the device approaching a tree to be engaged.
FIG. 3b is a top plan view of the exemplary embodiment of the present invention shown in FIG. 3a, the device engaging a tree.

FIG. 3a depicts an exemplary embodiment of a tree shaking device 110 of the present invention just prior to engagement with a tree 122. Boom 112 is pivoted at boom pivot 114, allowing, as noted above, the operator of device 100 an improved view of tree 122 as device 110 engages with tree 122. Shaker head 116 includes clamping arms 118 and 119 and conforming shaker pads 120, which are open and are not yet engaging tree 122. Shaker pads 120 are located on the inward-facing surfaces of the respective clamping arms, as shown in the figures, such that when the clamping arms engage a tree the shaker pads 120 are positioned between the clamping arms and the tree. Boom 112 is pivoted at a first angle 124 with respect to a longitudinal axis and direction of travel of device 110.

FIG. 3b depicts the device 110 of FIG. 3a as tree 122 is engaged. Clamping arms 118 and 119 of shaker head 116 are in a closed position, with conforming shaker pads 120 engaging tree 122. Boom pivot 114 is unlocked prior to engagement of tree 122 by clamping arms 118 and 119 and conforming shaker pads 120. This allows the device to conform more precisely to tree 122 and eliminates side load on device 110. Clamping arms 118 and 119 engage the tree by a closing motion of at least one clamping arm (in the embodiment shown in the figures, clamping arm 118 moves in a closing motion to cause the clamping arms to engage the tree). One clamping arms 118 and 119 are engaged, the tree is shaken as described more fully below. Boom 112 is now at a second angle 126 with respect to the longitudinal axis and direction of travel of device 110. After shaking is complete, boom 112 returns to its pre-clamp position, as shown in FIG. 3a, in order to avoid contact with the tree when disengaging. The process of locking and unlocking boom 112 to allow a more precise conformation of device 110 to tree 122 reduces damage to both tree 122 and device 110. As shown in FIGS. 3a and 3b, depicting an exemplary embodiment of the present invention, boom 112 preferably begins at an angle of about thirty degrees (FIG. 3a) with respect to the longitudinal axis of shaker 110. When boom pivot 114 is unlocked and clamping arms 118 and 119 engage the tree, boom 112 pivots to an angle of about thirty-three degrees (FIG. 3b) with respect to the longitudinal axis of shaker 110. It is this play in the angle of boom 112 during the clamping process that eliminates side load on shaker 110 during clamping. Although specific angles or a range of angles is provided herein with respect to the relationship between boom 112 and device 100, it is understood that any suitable angle maybe used so long as that angle furthers the objectives of better visibility on the part of the operator of device 110, and/or better or more efficient steering and maneuverability between trees. Likewise, though the amount of the play in the unlocked boom during the clamping cycle is given above as around three degrees, it is contemplated that the actual amount of play will vary depending on the physical characteristics of a given tree, the terrain, and other factors. The unlocked nature of the boom pivot allows for any necessary or desirable amount of play in the device.

Figure 4:
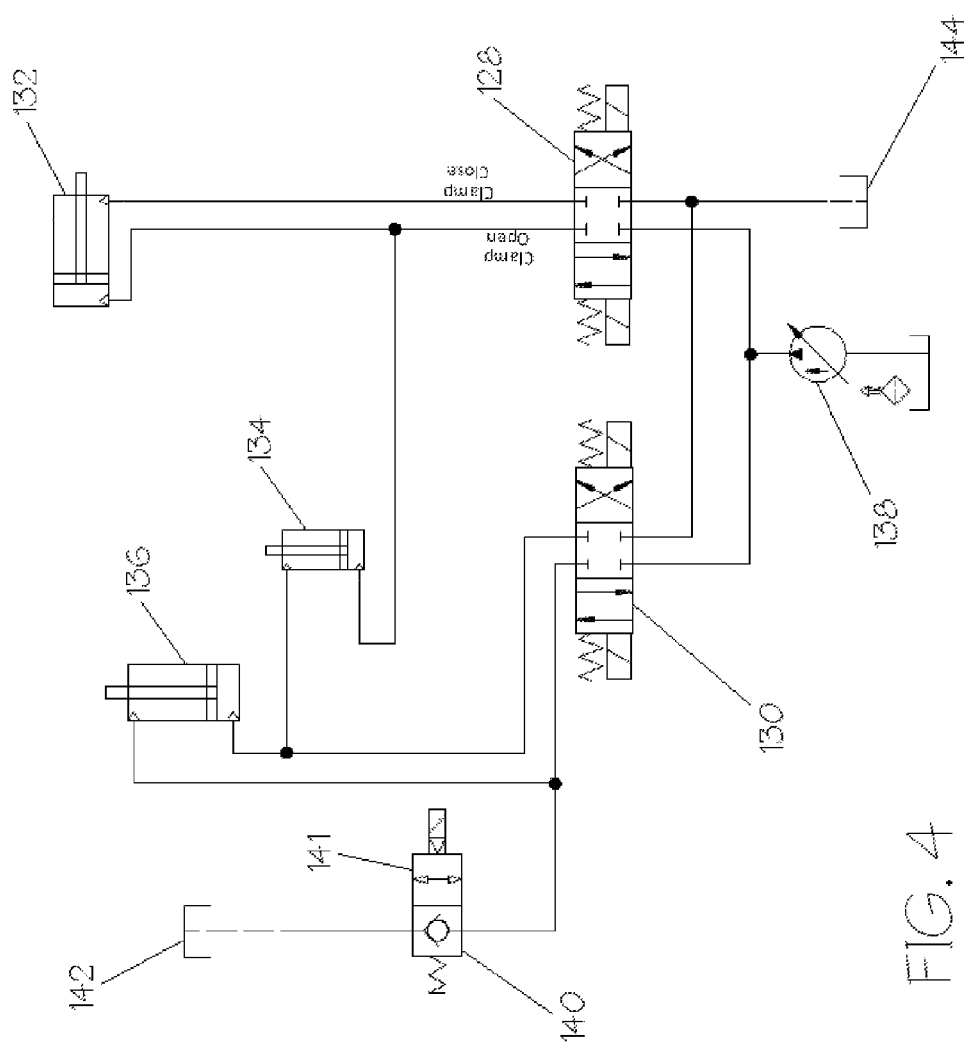
FIG. 4 is a hydraulic schematic of one embodiment of a tree shaking device of the present invention.
Figure 5:
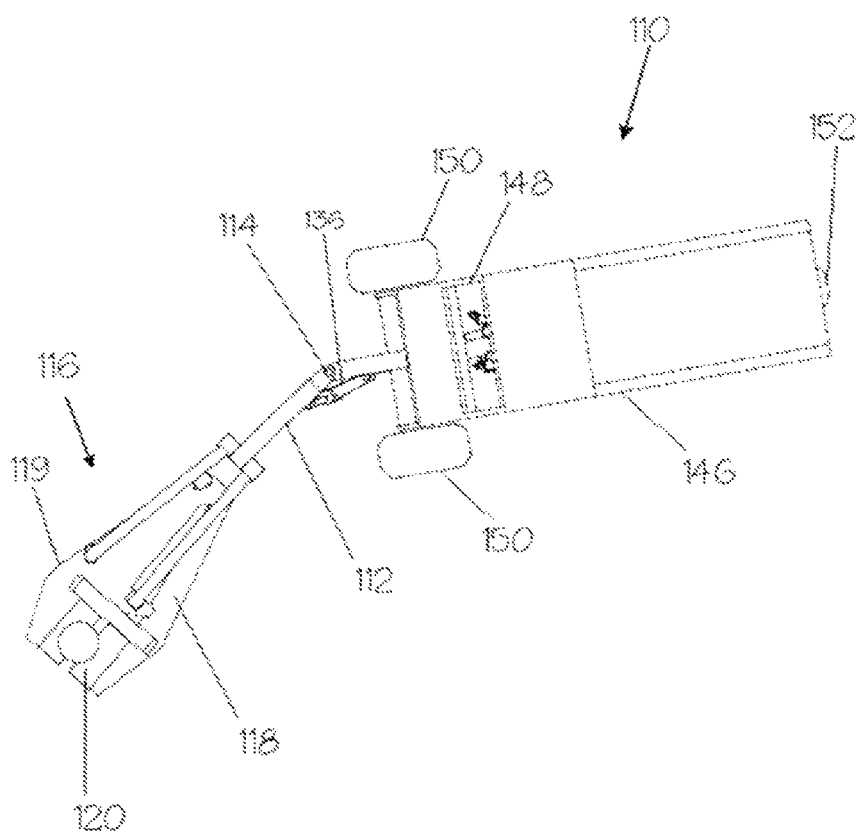
FIG. 5 is a top, plan view of one embodiment of the present tree shaker showing one exemplary position of a hydraulic cylinder thereof.

FIG. 4 provides a hydraulic schematic of one embodiment of a device 110 of the present invention. As can be seen in the figure, a variable displacement pump 138 is utilized for pumping hydraulic fluid through the system. A closed center control valve is used for boom position valve 130, allowing unlocking and locking of boom 112 via boom angle cylinder 136. Likewise, a closed center control valve is used for tree clamp valve 128, allowing control of clamping arms 118 via tree clamp cylinder 132. It should be noted that the hydraulic schematic shown in FIG. 4 is exemplary, depicting one possible control scheme for use with the present invention. Any suitable hydraulic system may be employed to achieve the results of the present invention. Also included are hydraulic check valve 140, reservoirs 142 and 144, and slave cylinder 134. Hydraulic check valve 140 is preferably electrically controlled, such as via solenoid 141.

The present device also provides a novel method of shaking trees for harvesting the fruits, nuts, or other products therefrom. An operator of shaker 110 positions the device with respect to a tree to be shaken. The angle of boom 112 provides greater visibility to the operator so that shaker 110 can be more precisely positioned in a desired location. Further, the angled boom 112 allows for the operator to move more efficiently from tree to tree with less steering. Once device 110 is positioned properly with respect to a tree 122, with clamping arm 118 in an opened position, the operator unlocks booms pivot 114 using the hydraulic systems of the present device, as shown in the hydraulic schematic of FIG. 4. As clamping arm 118 close onto tree 122, conforming shaker pads 120 on both clamping arms 118 and 119 grip the tree firmly and protect the tree from damage. The unlocked boom pivot 114 allows for movement of boom 112 during this clamping process so that the clamping arms 118 and 119 can more readily conform to the individual tree to be shaken, and so that a more firm, secure grip can be established. Once again this protects the tree from damage. In the embodiment shown, only clamping arm 118 undergoes the opening and closing motion, pivoting around pivot 154, with clamping arm 119 being positioned adjacent the tree by the operator. In other embodiments of the invention, both clamping arms 118 and 119 may undergo the closing motion to engage with a tree.

When clamping arm 118 closes, the tree is firmly positioned between both clamping arms 118 and 119. When clamping arm 118 is closed and the tree is securely gripped between clamping arms 118 and 119, the operator of device 110 may, in some embodiments of the method, lock boom pivot 114. A shaking force is then applied to tree 122 by device 110, causing fruit, nuts, and other products to be dislodged from the tree. A variety of ways of applying the shaking force are known in the tree shaker art, and it is contemplated that any suitable method of applying the shaking force may be used in conjunction with the present invention. After shaking is complete, the operator once again unlocks boom pivot 114 and disengages the clamping arms 118 and 119 from the tree. After disengagement from tree 122, boom 112 preferably returns to its original position. The operator can then withdraw shaker 110 from the tree without damaging the tree, and then move to the next tree to be shaken.

The exemplary embodiments of the present invention described above pertain to a device 110 having a front-mounted boom. Some known tree shakers have a side-mounted boom, extending perpendicular to the longitudinal axis of the tree shaker. It is contemplated that the teachings of the present invention may be used in conjunction with such side-mounted tree shakers as well as with the front-mounted tree shakers described above. With respect to a side-mounted shaker, the boom may be provided with a boom pivot, as described above, the angle of the boom being adjustable for ease and efficiency in approaching trees to be shaken by the device. Further, the lockable and unlockable nature of the boom pivot provides the same advantages with respect to the side-mounted shaker as with respect to the front-mounted shaker, namely a reduction or elimination in sideloading forces that may damage the tree or the tree shaker during the clamping operation.

In addition to the pivotable boom described above, it is contemplated that the position of the boom may be adjusted by the operator of the tree shaker by moving the boom along a track such that the boom may, for example, travel along the length of the side of the tree shaker in the case of a side-mounted device. This movement along a track allows an operator greater control over the precise positioning of the boom prior to engaging a tree, thereby preventing or minimizing damage to the tree or the tree shaker as the tree is approached by the tree shaking device. Embodiments having a boom that moves along a track may also include the lockable and unlockable pivot described above such that once the tree shaker is in proper position relative to the tree and the clamping action has begun, sideloading forces on the tree and tree shaker are minimized or eliminated, further preventing damage to the tree or the device.

In the exemplary method of operation of the present device, described above, the boom pivot is preferably unlocked once the shaker head is in position with respect to a tree, and prior to the commencement of the clamping process. It is contemplated, however, that with some embodiments of the present method, the boom pivot may be unlocked before the shaker head is in final position around the tree. Such an approach may be desirable, for example, when visibility is greatly reduced and there exists an increased risk of striking the tree with the shaker head. If the boom pivot is unlocked during the approach to the tree, the "play" in the boom pivot may absorb some of the force if the shaker head strikes the tree, thereby reducing damage to the tree or to the tree shaker.

The foregoing description provides exemplary embodiments of the present invention. It is contemplated that various modifications to the embodiments described will be readily apparent to those of skill in the art upon reading this disclosure. Such modifications may include, but are not limited to, changes in the boom angle, the design of the shaker head, clamping arms, or conforming shaker pads, modifications to the hydraulic system, and the like. It is contemplated that such changes are well within the spirit and scope of the present invention.

Having thus described the preferred embodiment of the invention, what is claimed as new and desired to be protected by Letters Patent includes the following:

1. A tree shaker comprising:
   a mobile vehicle;
   a boom attached to the vehicle and having a first portion and a second portion, the first portion of said boom offset at an angle with respect to a longitudinal axis of the vehicle;
   a boom pivot along the length of the boom between the first portion and the second portion thereof; and
   a hydraulic control valve operatively engaged with said boom, the control valve having a first, open position wherein the first portion of the boom is free to pivot horizontally about said boom pivot, and a second position wherein the first portion of the boom is unable to pivot about said boom pivot.

2. The tree shaker according to claim 1 wherein the angle of the first portion of the boom with respect to the longitudinal axis of the vehicle is less than about forty-five degrees.

3. The tree shaker according to claim 1 further comprising a shaker head, the shaker head comprising at least one engageable and disengageable clamping arm, the shaker head attached to the boom at an end thereof opposite the end of the boom attached to the vehicle.

4. The tree shaker according to claim 3 wherein the at least one clamping arm comprises a shaker pad attached to an inward-facing surface thereof such that the shaker pad is between the clamping arm and a tree when the shaker head engages the tree.

5. The tree shaker according to claim 3 wherein the shaker head comprising:
   a first clamping arm fixedly attached to the boom; and
   a second clamping arm pivotably attached to the first clamping arm at a clamping arm pivot,
wherein the second clamping arm is engageable and disengageable by pivoting around the clamping arm pivot.

6. The tree shaker according to claim 1, further comprising a hydraulic cylinder in fluid communication with the hydraulic control valve, the hydraulic cylinder operable to pivot the first portion of the boom about the boom pivot or to prevent the pivoting thereof.

7. A method for harvesting fruits, nuts, and other tree-borne products, the method comprising the steps of:
   a) approaching a tree with a vehicle comprising a boom Pivotable to an angle offset to a longitudinal axis of the vehicle, the vehicle further comprising a boom pivot, a hydraulic control valve operatively engaged with said boom, the control valve having a first, open position wherein the boom is unlocked and free to pivot about the boom pivot and a second position wherein the boom is locked and unable to pivot about the boom pivot, and having a shaker head attached to the boom, the shaker head comprising first and second clamping arms;

b) unlocking said boom pivot with the hydraulic control valve when the shaker head is in position for the clamping arms to engage the tree;

c) engaging the tree by a closing motion of at least one of the clamping arms;

d) applying to the tree a shaking force from the tree shaker;

e) disengaging the clamping arms from the tree.

8. The method according to claim 7, further comprising the step of:

f) returning the boom to its original position.

9. The method according to claim 7 wherein the step b) of unlocking the boom pivot is performed prior to the step a) of approaching the tree.

10. The method according to claim 7 further comprising the step f) of locking the boom pivot prior to step d) of applying a shaking force to the tree.

11. The method according to claim 10 further comprising the step g) of unlocking the boom pivot after step d) of applying a shaking force to the tree.

12. A tree shaker comprising:

a mobile vehicle;

a boom attached to the vehicle and Pivotable to an angle offset with respect to a longitudinal axis of the vehicle;

a boom pivot about which said boom is pivotable;

a hydraulic control valve operatively engaged with said boom, the control valve having a first, open position wherein the boom is unlocked and free to pivot horizontally about said boom pivot, and a second position wherein the boom is locked and unable to pivot about said boom pivot, a shaker head, the shaker head comprising a first stationary clamping arm and a second pivotable clamping arm, the second clamping arm pivotably attached to the first clamping arm, the shaker head attached to the boom at an end thereof opposite the end of the boom attached to the vehicle;

a first shaker pad attached to an inward facing surface of the first clamping arm; and a second shaker pad attached to an inward facing surface of the second clamping arm, wherein when said shaker engages a tree and said boom pivot is unlocked, the boom is free to pivot around the boom pivot so that the first and second shaker pads can conform more closely to said tree.

13. The tree shaker according to claim 12 wherein the vehicle comprises:

a vehicle body;

first and second wheels rotatably attached to the vehicle body at a front end thereof; and at least one wheel rotatably attached to the vehicle body at a rear end thereof.

14. The tree shaker according to claim 13 wherein the vehicle body defines an interior operator cab.

15. The tree shaker according to claim 12 wherein the angle of the boom with respect to the longitudinal axis of the vehicle is greater than about ten degrees.

16. The tree shaker according to claim 15 wherein the angle of the boom with respect to the longitudinal axis of the vehicle is less than about forty-five degrees.

17. The tree shaker according to claim 12, further comprising a hydraulic cylinder in fluid communication with the hydraulic control valve, the hydraulic cylinder operable to pivot the boom about the boom pivot or to prevent the pivoting thereof.

* * * * *